(12) United States Patent
Tajiri

(10) Patent No.: US 11,457,286 B2
(45) Date of Patent: Sep. 27, 2022

(54) VIDEO DISTRIBUTION APPARATUS, DISTRIBUTION METHOD, AND RECORDING MEDIUM

(71) Applicant: CANON KABUSHIKI KAISHA, Tokyo (JP)

(72) Inventor: Katsutoshi Tajiri, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 16/517,459

(22) Filed: Jul. 19, 2019

(65) Prior Publication Data

US 2020/0037041 A1  Jan. 30, 2020

(30) Foreign Application Priority Data

Jul. 25, 2018  (JP) .............................. JP2018-139326

(51) Int. Cl.
| | |
|---|---|
| *H04N 21/658* | (2011.01) |
| *H04N 21/61* | (2011.01) |
| *H04N 21/262* | (2011.01) |
| *H04N 21/845* | (2011.01) |

(52) U.S. Cl.
CPC ... *H04N 21/6125* (2013.01); *H04N 21/26216* (2013.01); *H04N 21/658* (2013.01); *H04N 21/845* (2013.01)

(58) Field of Classification Search
CPC ........................... H04N 21/234; H04N 21/235
See application file for complete search history.

(56) References Cited

U.S. PATENT DOCUMENTS

| | | | |
|---|---|---|---|
| 7,145,492 B2 * | 12/2006 | Hirano | H04N 21/8358 341/110 |
| 11,044,297 B2 * | 6/2021 | Lederer | H04N 21/8456 |
| 2009/0222596 A1 * | 9/2009 | Flynn | G06F 3/0659 711/155 |

(Continued)

FOREIGN PATENT DOCUMENTS

| | | |
|---|---|---|
| JP | 2013-012231 A | 1/2013 |
| WO | 2016/063161 A1 | 4/2016 |
| WO | 2018/060489 A1 | 4/2018 |

OTHER PUBLICATIONS

Yuriy Reznik, Proposed editorial improvements to WD ISO/IEG 23009-3, Feb. 12, 2012, 28 pages, ISO/IEC JTC1/SC29/WG11, MPEG2010/M24978, San Jose, US.

*Primary Examiner* — Mushfikh I Alam
(74) *Attorney, Agent, or Firm* — Canon U.S.A., Inc. IP Division

(57) ABSTRACT

A generation unit generates a plurality of pieces of segment data, and appends an index to each of the plurality of pieces of segment data in a predetermined order. Each piece of the segment data corresponds to each predetermined time period of video data. A reception unit receives, from an external apparatus, an acquisition request which is for the external apparatus to acquire segment data and designate an index of the segment data. In a case where an index of segment data which is generated after a lapse of a predetermined time period or longer from a time when the acquisition request is received by the reception unit is designated by the acquisition request, the generation unit appends the index designated by the acquisition request to the segment data regardless of the predetermined order.

4 Claims, 11 Drawing Sheets

(56) References Cited

U.S. PATENT DOCUMENTS

| | | | |
|---|---|---|---|
| 2012/0023254 A1* | 1/2012 | Park | H04L 47/30 709/231 |
| 2012/0195362 A1* | 8/2012 | Benno | H04N 21/8456 375/240.01 |
| 2012/0233228 A1* | 9/2012 | Barton | G06F 16/178 707/827 |
| 2013/0191511 A1 | 7/2013 | Liu et al. | |
| 2014/0115724 A1* | 4/2014 | van Brandenburg | G06F 21/10 726/30 |
| 2014/0165093 A1* | 6/2014 | Redol | H04N 21/8583 725/32 |
| 2014/0184734 A1 | 7/2014 | Nakagawa | |
| 2014/0188826 A1* | 7/2014 | Gjaltema | G06F 3/0674 707/696 |
| 2014/0258449 A1* | 9/2014 | Holden | H04N 21/25833 709/217 |
| 2014/0325018 A1 | 10/2014 | Ai et al. | |
| 2015/0256600 A1* | 9/2015 | Dakhane | H04L 65/60 709/203 |
| 2016/0014179 A1* | 1/2016 | Straub | H04L 65/602 709/217 |
| 2016/0127440 A1* | 5/2016 | Gordon | H04L 65/601 709/219 |
| 2017/0149860 A1 | 5/2017 | Ben Eli et al. | |
| 2017/0332113 A1* | 11/2017 | Haritaoglu | H04N 21/8456 |
| 2017/0332114 A1* | 11/2017 | Turgut | H04N 21/2187 |
| 2018/0097864 A1* | 4/2018 | Brinkley | H04L 65/608 |
| 2018/0220189 A1* | 8/2018 | Hodge | G08B 13/19647 |
| 2019/0238816 A1* | 8/2019 | Sun | G06T 5/009 |
| 2020/0275144 A1* | 8/2020 | Major | H04L 43/0888 |
| 2020/0404361 A1* | 12/2020 | Lohmar | H04N 21/44004 |
| 2020/0413111 A1* | 12/2020 | Varadarajan | H04N 21/2393 |

\* cited by examiner

VIDEO DISTRIBUTION APPARATUS, DISTRIBUTION METHOD, AND RECORDING MEDIUM

BACKGROUND OF THE INVENTION

Field of the Invention

The present invention relates to a video distribution apparatus, a distribution method, and a recording medium.

Description of the Related Art

In moving image services, an adaptive bitrate streaming technique using a hyper text transfer protocol (HTTP) has been in widespread use. Examples of the adaptive bitrate streaming technique include Dynamic Adaptive Streaming over HTTP (DASH) and HTTP Live Streaming (HLS). DASH is a technique standardized by Moving Picture Experts Group (MPEG). HLS is a technique standardized at the initiative of Apple Inc. With such video distribution techniques, problems inherent in Real-time Transport Protocol (RTP), such as a requirement for a special client application, can be solved, and a distributed moving image can be received and reproduced on a normal browser.

In a general DASH distribution, a distribution server divides a plurality of pieces of moving image data each having a different resolution and a bit rate into moving image files, each of which is called a segment and corresponds to several seconds, and a client sequentially downloads and reproduces the moving image files depending on a display performance and a communication band. Specifically, the client first acquires a Media Presentation Description (MPD) file having description of information about the entire moving image, and selects a moving image stream with an appropriate resolution and bit rate from the MPD file. Then, the client downloads and reproduces moving image data of an MPEG2-transport stream (TS) or MP4 file for each segment in accordance pith the description of the MPD.

In particular, in a live distribution, the distribution server divides moving image data into segments and buffers the segments for a predetermined time period, and the client acquires the segments during a buffering period of the distribution server at an appropriate timing and smoothly reproduce the segments. Accordingly, it is important that a timing at which the distribution server prepares a segment coincides with a timing at which the client acquires the segment. Japanese Patent Application Laid-Open No. 2013-12231 discusses a technique in which a distribution server transmits a list of changed file names each indicating a change of a file to a client when a file included in a list of files previously transmitted is changed.

As described above, in the live distribution using the adaptive bitrate streaming technique, the form of a file name is shared between the distribution server and the client and it is necessary for the client to acquire a file at an appropriate timing, in consideration of the time and an elapsed time period. However, if the time of the client is changed during distribution of a video image and a difference in a timing for file acquisition between the client and the distribution server increases due to, for example, an error in a central processing unit (CPU) clock, there arises an issue of communication disconnection because the distribution processing cannot be continued.

SUMMARY OF THE INVENTION

Accordingly, the present invention is directed to continuously performing distribution processing without disconnecting a communication even when a difference is generated between the time of a video distribution apparatus and the time of a client apparatus during distribution of a video image. The present invention has, for example, the following configuration.

According to an aspect of the present invention, a video distribution apparatus includes a generation unit configured to generate a plurality of pieces of segment data, and to append an index to each of the plurality of pieces of segment data in a predetermined order, wherein each piece of the segment data corresponds to each predetermined time period of video data, a reception unit configured to receive, from an external apparatus, an acquisition request which is for the external apparatus to acquiring acquire segment data and designating designate an index of the segment data, and a transmission unit configured to transmit, to the external apparatus, segment data corresponding to the index designated by the acquisition request, wherein in a case where an index of segment data which is generated after a lapse of a predetermined time period or longer from a time when the acquisition request is received by the reception unit is designated by the acquisition request, the generation unit appends the index designated by the acquisition request to the segment data regardless of the predetermined order.

According to another aspect of the present invention, a client apparatus that communicates with a video distribution apparatus including a generation unit configured to generate a plurality of pieces of segment data and to append an index to each of the plurality of pieces of segment data in a predetermined order, wherein each piece of the segment data corresponds to each predetermined time period of video data, the client apparatus includes a transmission unit configured to transmit, to the video distribution apparatus, an acquisition request for acquiring segment data and designating an index of the segment data, and a reception unit configured to receive, from the video distribution apparatus, segment data corresponding to the index designated by the acquisition request, wherein even in a case where an index of segment data which is generated after a lapse of a predetermined time period or longer from a time when the acquisition request is transmitted by the transmission unit is designated by the acquisition request, the reception unit receives the segment data to which the index designated by the acquisition request is appended regardless of the predetermined order.

Further features of the present invention will become apparent from the following description of exemplary embodiments with reference to the attached drawings. It should be understood that any of the features described herein in relation to a particular set of embodiments/examples may be combined with the features of another set of embodiments/examples without any limitations other than those imparted by the broadest aspects of the invention as defined hereinabove.

DESCRIPTION OF THE EMBODIMENTS

Exemplary embodiments of the present invention will be described below with reference to the accompanying drawings. According to the present exemplary embodiments, moving image data refers to video data for simplicity of explanation. However, it will be appreciated that moving image data may additionally or alternatively include audio data, image/audio analysis data and/or caption data.

Figure 1:
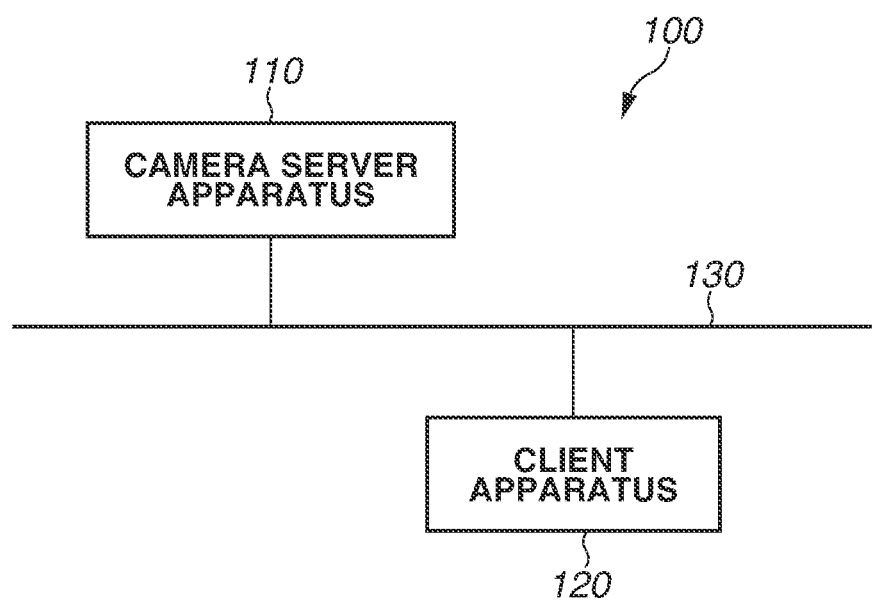
FIG. 1 is an overall configuration diagram illustrating a video distribution system according to a first exemplary embodiment.

FIG. 1 is an overall configuration diagram illustrating a video distribution system 100 according to a first exemplary embodiment. A camera server apparatus 110 and a client apparatus 120 are connected to each other via a network 130. The camera server apparatus 110 includes a camera, and distributes captured images to the client apparatus 120 via the network 130. The client apparatus 120 accesses the camera server apparatus 110 to acquire images.

The present exemplary embodiment illustrates one camera server apparatuses 110 and one client apparatuses 120 for simplicity of explanation. However, it will be understood that the video distribution system 100 may comprise two or more camera server apparatuses 110 and/or two or more client apparatuses 120. Two or more camera server apparatuses 110 may distribute a video image to a single client apparatus 120. Two or more client apparatuses 120 may receive a video image from a single camera server apparatus 110. The network 130 includes a plurality of routers, switches, cables, or the like, which satisfies communication standards such as Ethernet®. The network 130 is the Internet, a local area network (LAN), or the like.

Figure 2:
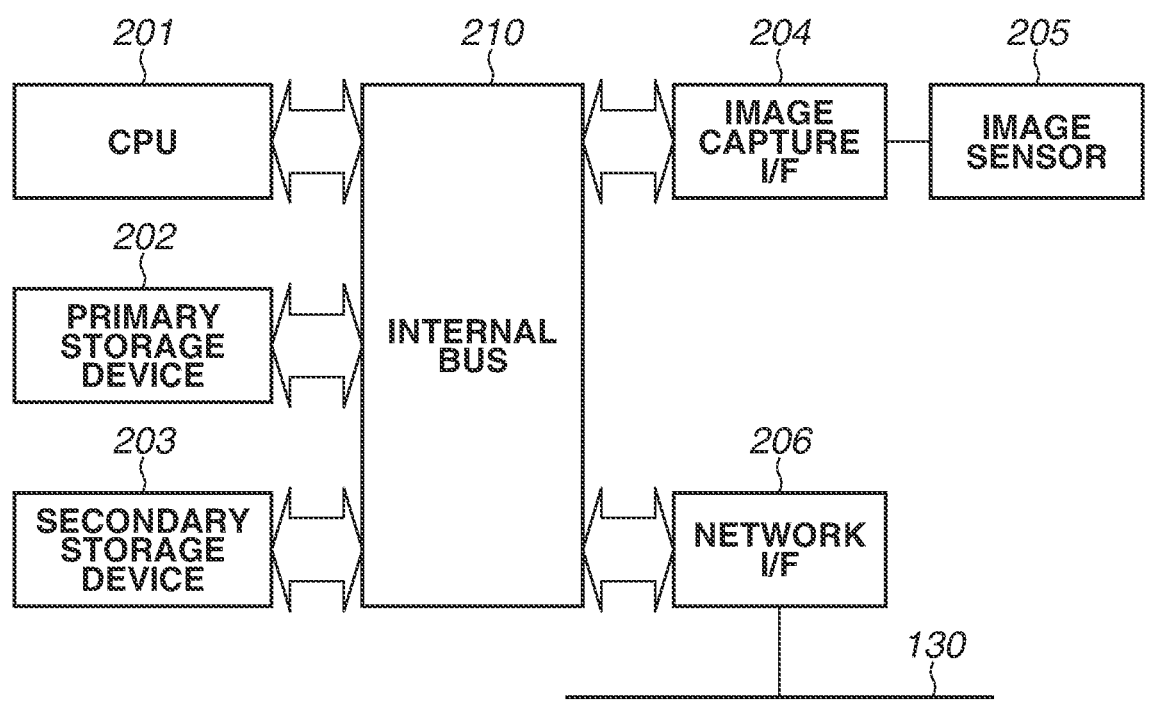
FIG. 2 is a hardware configuration diagram illustrating a camera server apparatus.

FIG. 2 is a hardware configuration diagram illustrating the camera server apparatus 110. A central processing unit (CPU) 201, a primary storage device 202, a secondary storage device 203, an image capture interface (I/F) 204, and a network I/F 206 are connected to each other via an internal bus 210. The CPU 201 controls the entire camera server apparatus 110. The primary storage device 202 is a high-speed writable storage device as typified by a random access memory (RAM). An operating system (OS), various programs, and various data are loaded into the primary storage device 202, and the primary storage device 202 is also used as a work area for the OS and various programs. The secondary storage device 203 is a nonvolatile storage device as typified by a flash memory, a hard disk drive (HDD), a secure digital (SD) card, or the like. The secondary storage device 203 is used as a permanent storage area for the OS, various programs, and various data. The secondary storage device 203 is also used as a temporary storage area for various data. Functions and processing of the camera server apparatus 110 to be described below are implemented in such a manner that the CPU 201 reads out a program stored in the secondary storage device 203 and executes the program.

The image capture I/F 204 is connected to an image sensor 205 which includes a charge-coupled device (CCD) sensor or a complementary metal-oxide semiconductor (CMOS) sensor. The image capture I/F 204 converts or compresses image data acquired from the image sensor 205 into a predetermined format, and transfers the image data to the primary storage device 202. The network I/F 206 is an I/F for connecting to the network 130 described above, and performs communication with the client apparatus 120 and the like via a communication medium such as Ethernet®.

Figure 3:
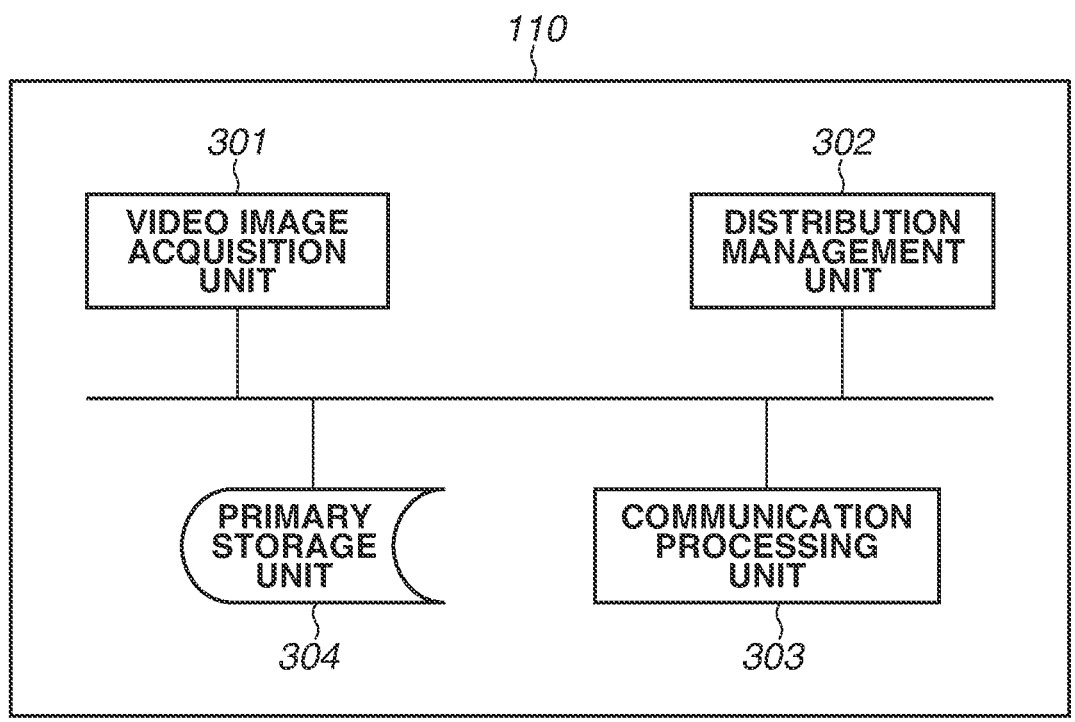
FIG. 3 is a block diagram illustrating functions of the camera server apparatus.

FIG. 3 is a block diagram illustrating functions of the camera server apparatus 110. A video image acquisition unit 301 acquires a video frame generated by the image sensor 205 via the image capture I/F 204, performs coding processing on the video frame, and stores the video frame in a primary storage unit 304. The primary storage unit 304 temporarily stores the generated video frame. The video frame is deleted from the primary storage unit 304 after the distribution is completed.

Upon receipt of a distribution start request from the client apparatus 120, a distribution management unit 302 transmits a Media Presentation Description (MPD) file including video stream information that can be distributed via a communication processing unit 303. The distribution management unit 302 converts one or more video frames stored in the primary storage unit 304 into a segment (moving image file) that can be transmitted, and transmits the segment via the communication processing unit 303 in response to a request from the client apparatus 120. In this case, a segment is an example of interval data included in video data—i.e. a segment is a section of video data, comprising one or more frames of the video data. The duration of a segment may, for example, correspond to a predetermined period.

Figure 4:
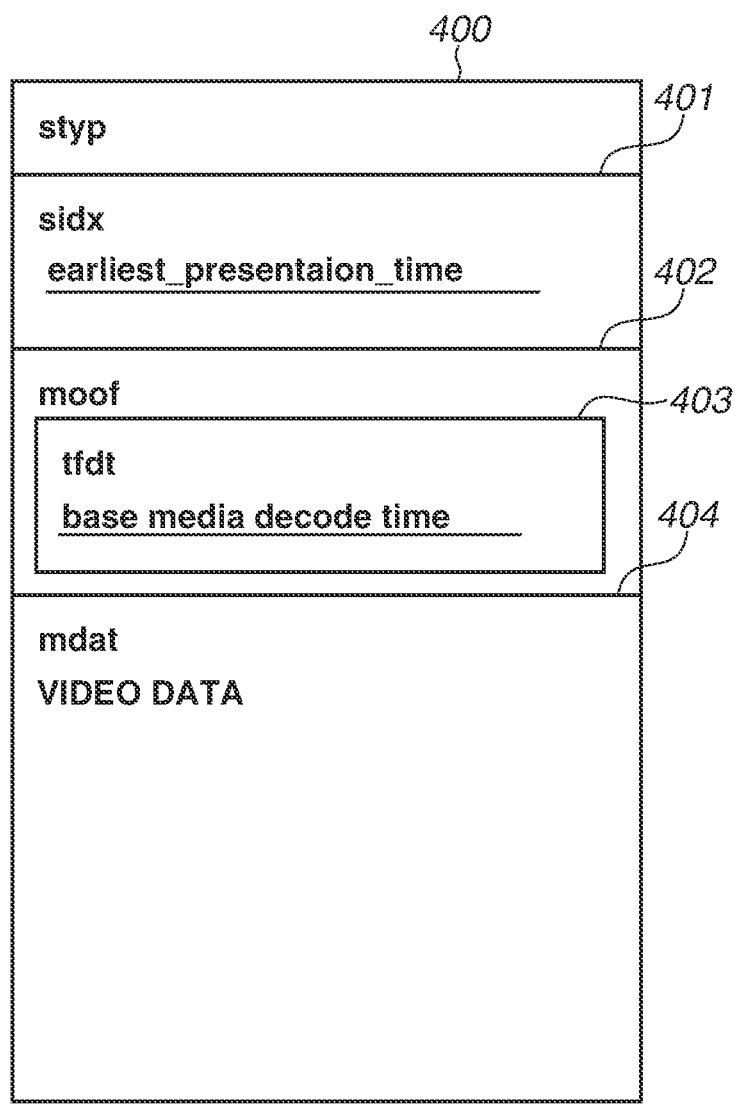
FIG. 4 is a diagram illustrating a configuration example of segment data.

FIG. 4 is a diagram illustrating, as an example, the configuration of a piece of segment data when the data is distributed in an MP4 file format. At the head of the segment data, a BOX styp 400 indicating a segment and a BOX sidx 401 indicating an order of a segment are present. The BOX sidx 401 includes an earliest presentation time indicating an elapsed time period from the start of distribution. Below the BOX sidx 401, a BOX moof 402 indicating a head of a fragment is present, and the BOX moof 402 includes a BOX tfdt 403 indicating time information about the fragment. The BOX tfdt 403 includes a base media decode time indicating an elapsed time period from the start of distribution. At the end, a BOX mdat 404 including video data is present.

Next, real-time video distribution processing to be performed by the camera server apparatus 110 will be described. In the real-time video distribution processing, the camera server apparatus 110 generates, from video data, a plurality of segments. Each segment corresponds to a different section of the video data. Preferably, the segments are generated and/or ordered in an order corresponding to a reproduction order, and are ideally transmitted sequentially in accordance with the reproduction order in response to an acquisition request from the client apparatus 120. The camera server apparatus 110 is also configured to append a segment number (index) to each of the segments in an order in which the segments are generated (a predetermined order). When the distribution is started, the client apparatus 120 acquires an MPD file in which information about a video stream, a time when a segment can be distributed, an interval at which a segment is generated, a buffering time period, and the like are described. According to the present exemplary embodiment, the client apparatus 120 includes a segment number in a segment acquisition request to designate a segment to be acquired. Alternatively, the client apparatus 120 may indicate a segment to be acquired by designating a time or file offset position.

Figure 5:
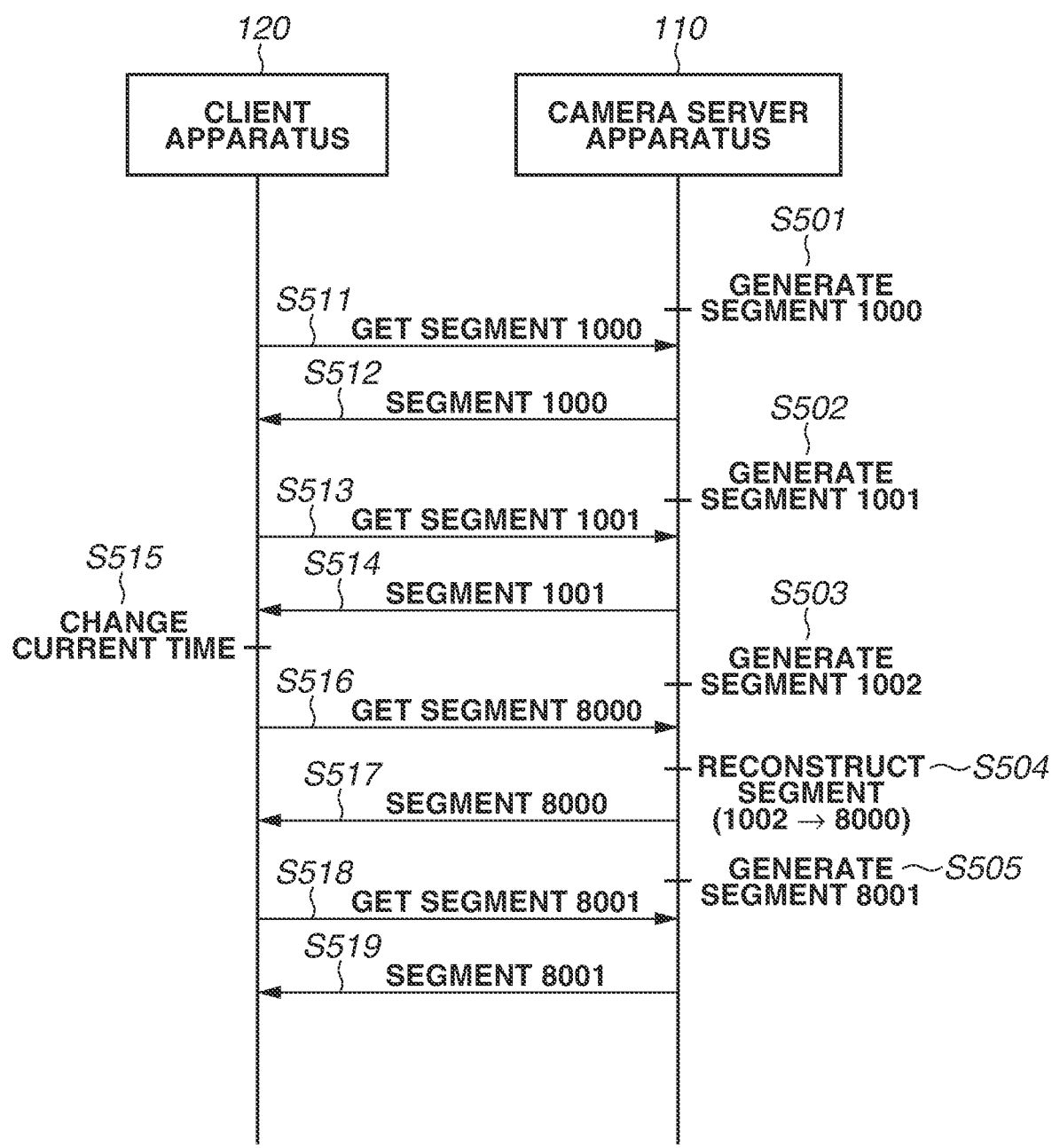
FIG. 5 is a sequence diagram illustrating video distribution processing.

FIG. 5 is a sequence diagram illustrating real-time video distribution processing. In particular, FIG. 5 illustrates processing to be performed when the internal time of the client apparatus 120 is changed during execution of video distribution processing. The internal time of the client apparatus 120 is changed using a clock function of the client apparatus 120. For example, it is changed by inputting new time or changing the time zone by user.

According to the present exemplary embodiment, the segment generation interval is one second. This means that each segment corresponds to one second duration of vide data. When the real-time video distribution processing is started, the distribution management unit 302 of the camera server apparatus 110 starts segment generation processing. In an example illustrated in FIG. 5, in step S501, the camera server apparatus 110 generates a segment 1000. Then, in steps S502 and S503, segments 1001 and 1002 are generated. The generated segments 1000, 1001, and 1002 are sequentially stored in a buffer (primary storage area).

Meanwhile, in step S511, the client apparatus 120 calculates a segment number from a distribution start time and a time when processing is executed. Then, the client apparatus 120 waits for a timing when the calculated segment (segment 1000) is generated, and transmits the acquisition request in which the segment 1000 is designated. In step S512, the client apparatus 120 receives the segment 1000 from the camera server apparatus 110 as a response to the acquisition request for the segment 1000. After that, in step S513, the client apparatus 120 calculates the subsequent segment number (segment 1001), and transmits the acquisition request for the segment 1001, and in step S514, the client apparatus 120 receives the segment 1001. At this point of time, in step S515, for example, the time of the client apparatus 120 is advanced by about 7000 seconds by a user operation, a Network Time Protocol (NTP), or the like.

The client apparatus 120 uses the current time for calculation of the subsequent segment number. Accordingly, when the time of the client apparatus 120 advances, the segment number also increases. That is, before the time of the client apparatus 120 advanced, the subsequent/next segment to be acquired by the client apparatus 120 would have been a segment following segment 1001 (i.e. it would have been segment 1002). However, as a consequence of the time of the client apparatus 120 advancing, the client apparatus 120 calculates segment 8000 as the next segment to be acquired. In this case, in step S516 after the time has advanced, the client apparatus 120 transmits the acquisition request for segment 8000.

The camera server apparatus 110 expects the acquisition request for segment 1002 during buffering. However, in step S516, the acquisition request for the segment 8000, i.e., the segment that is about 7000 seconds ahead of the segment 1002 is received. In other words, the camera server apparatus 110 receives the acquisition request for the segment 8000 at a timing after transmission of the segment 1001 and before transmission of the segment 1002. The acquisition request for the segment 8000 is originally a request to be made after a lapse of 7000 seconds. However, if processing to be performed after waiting for 7000 seconds is carried out, the communication is disconnected due to a response time-out of the client apparatus 120. Accordingly, according to the present exemplary embodiment, the camera server apparatus 110 transmits the segment being buffered as the segment 8000 to the client apparatus 120.

More specifically, first, in step S504, the camera server apparatus 110 reconstructs the segment 1002 being buffered into the segment 8000. The segment reconstruction is processing in which the segment being buffered is made into a requested segment by changing time information, segment information, a file name, or the like illustrated in FIG. 4, without changing video data in the segment being buffered. Next, in step S517, the camera server apparatus 110 transmits the reconstructed segment 8000 to the client apparatus 120. Then, in step S505, the camera server apparatus 110 generates a segment 8001 subsequent to the segment 8000. Upon receiving the segment 8000 in step S517, the client apparatus 120 transmits the acquisition request for the segment 8001 in step S518, and then receives the segment 8001 in step S519.

FIG. 5 illustrates an example in which the time of the client apparatus 120 is advanced. However, the present exemplary embodiment can also be applied to a case where the time of the client apparatus 120 is delayed. In this case, the camera server apparatus 110 may receive the acquisition request for the segment generated prior to (earlier than) the oldest (earliest) segment being buffered. Further, the camera server apparatus 110 may receive the acquisition request for the distributed segment again. In these cases, the camera server apparatus 110 reconstructs the segment. Thus, distribution processing can be continued. When the acquisition request for the distributed segment is received again, the camera server apparatus 110 may reconstruct the segment and transmit the reconstructed segment, and may re-transmit the distributed segment.

Figure 6:
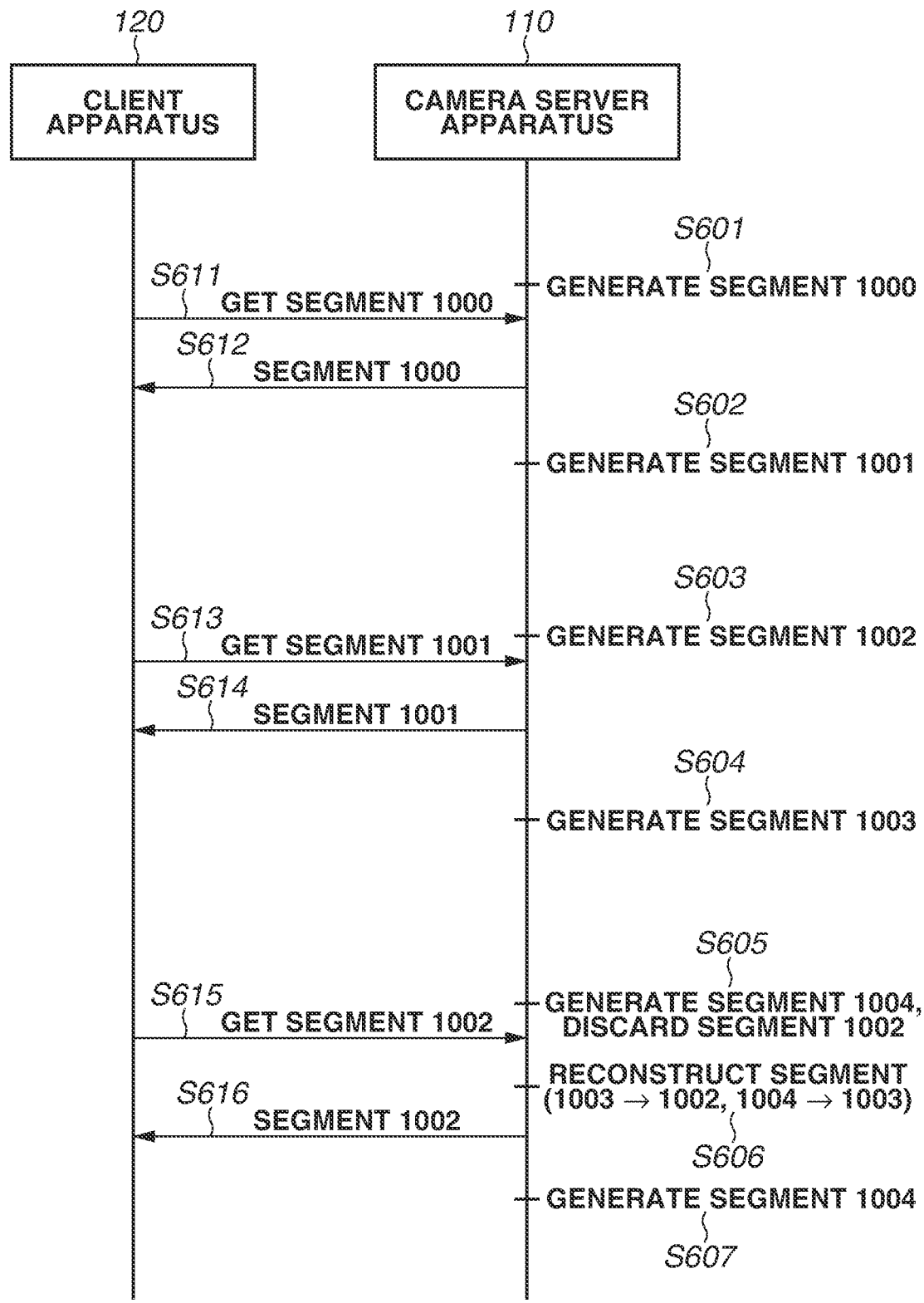
FIG. 6 is a sequence diagram illustrating video distribution processing.

FIG. 6 is a sequence diagram illustrating video distribution processing. Referring to FIG. 6, processing to be performed when a CPU clock error between the camera server apparatus 110 and the client apparatus 120 increases during execution of video image distribution processing will be described. According to the present exemplary embodiment, the segment generation interval is one second and the buffering time period is two seconds (corresponding to two segments). Further, in a first-in first-out (FIFO) system, the segment obtained after a lapse of two seconds from buffering is deleted from the buffer.

In an example illustrated in FIG. 6, in step S601, the camera server apparatus 110 generates the segment 1000, and in steps S602, S603, S604, and S605, the camera server apparatus 110 generates segments 1001, 1002, 1003, and 1004. Meanwhile, in step S611, the client apparatus 120 calculates the segment from a distribution start time and a time when processing is executed, waits for a timing when the calculated segment (segment 1000) is generated, and transmits the acquisition request for the segment 1000. Then, in step S612, the client apparatus 120 receives the segment 1000 as a response from the camera server apparatus 110.

After that, the client apparatus 120 calculates the subsequent segment and waits for a timing when the segment 1001 is generated. However, as described above, there is a CPU clock error between the camera server apparatus 110 and the client apparatus 120. Accordingly, in step S613, the client apparatus 120 transmits the subsequent segment acquisition request at a slightly late timing. In step S614, the client apparatus 120 receives the segment 1001 as a response from the camera server apparatus 110. According to the present exemplary embodiment, the timing is delayed by about one segment, for ease of understanding, while in practice, it may take several hours to several tens of hours until a difference of about several tens of parts per million (ppm), specifically, a difference of several seconds occurs. In addition, the camera server apparatus 110 can buffer only two segments. Therefore, in step S605, when the camera server apparatus 110 generates the segment 1004, the segment 1002 that is buffered and is not transmitted yet is discarded.

Meanwhile, the client apparatus 120 acquires the segment 1001, and then, in step S615, the client apparatus 120 waits for a timing when the segment 1002 is generated and transmits the acquisition request for the segment 1002. In step S615, the camera server apparatus 110 receives the acquisition request for the segment 1002 buffered before the oldest segment 1003 being buffered. In this case, in step S606, the camera server apparatus 110 reconstructs the segment 1003 that is buffered at the processing time into the segment 1002, and reconstructs the segment 1004 into the segment 1003. Then, in step S616, the camera server apparatus 110 transits the segment that is generated as the segment 1003 and is reconstructed into the segment 1002 to the client apparatus 120. In other words, the segment 1003 is transmitted as the segment 1002 to the client apparatus 120. Then, in step S607, the camera server apparatus 110 generates the segment (segment 1004) subsequent to the segment reconstructed in step S606, instead of generating the segment subsequent to the segment generated in step S604. Thus, in step S606, the camera server apparatus 110 appends the segment number (index) designated by the acquisition request to segment data, regardless of the order in which the segment is generated (the predetermined order).

In the example illustrated in FIG. 6, in step S606, the camera server apparatus 110 reconstructs the segment 1003 into the segment 1002. However, in consideration of real-time characteristics, the camera server apparatus 110 may discard the segment 1003 and reconstruct the segment 1004 into the segment 1002. In this case, the segment generated in step S607 is the segment 1003.

FIG. 6 illustrates an example in which the CPU clock in the client apparatus 120 is later than the CPU clock in the camera server apparatus 110. However, if the CPU clock in the client apparatus 120 is earlier than the CPU clock in the camera server apparatus 110, a sequence diagram similar to FIG. 5 is applied.

Figure 7:
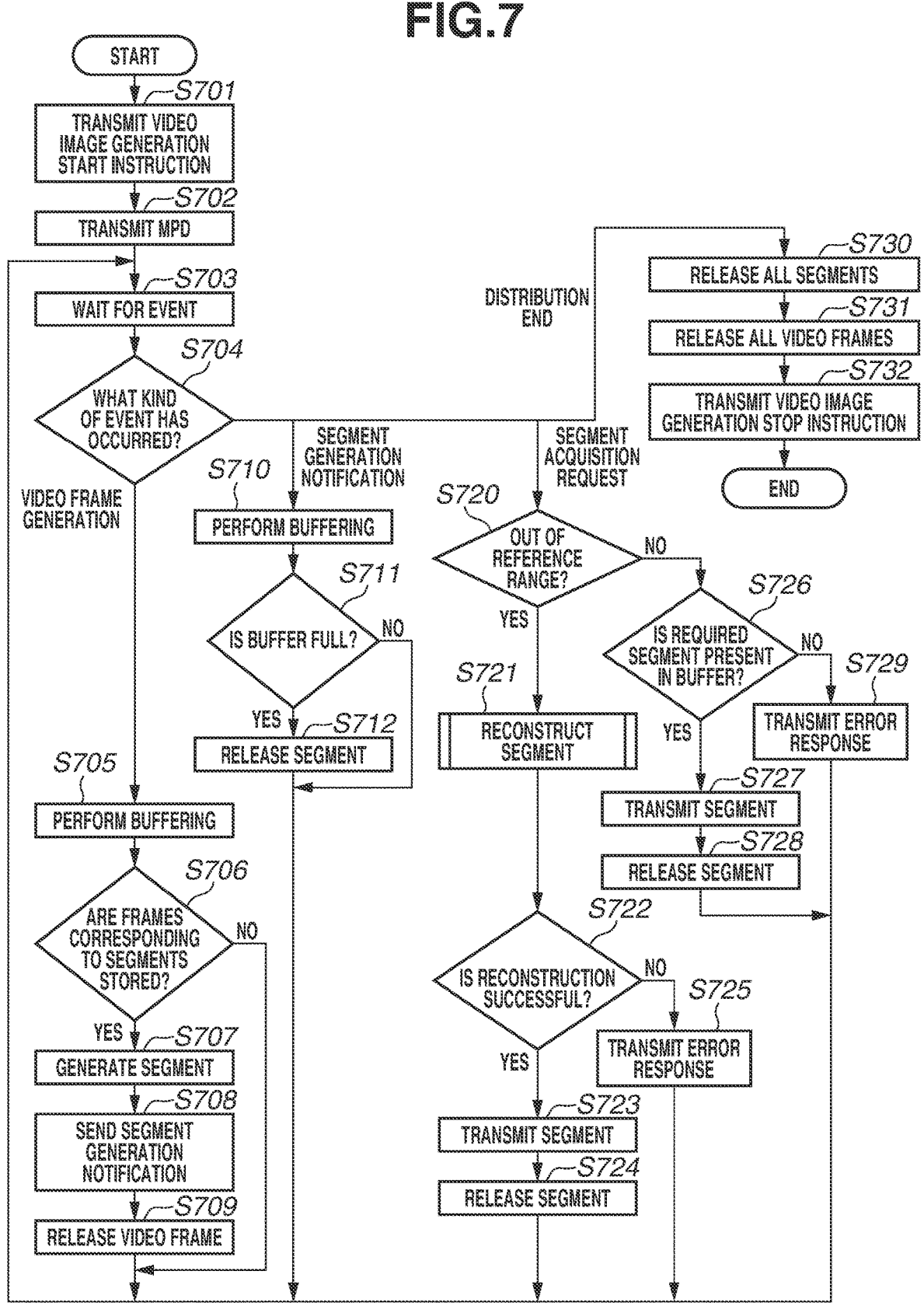
FIG. 7 is a flowchart illustrating video distribution processing.

FIG. 7 is a flowchart illustrating video distribution processing to be performed by the camera server apparatus 110. When the camera server apparatus 110 receives the distribution start request from the client apparatus 120, the video distribution processing is started. In step S701, the distribution management unit 302 of the camera server apparatus 110 transmits a video image generation start instruction to the video image acquisition unit 301. In step S702, the distribution management unit 302 transmits an MPD file in which information about a time when a video image can be distributed and a video stream, a segment generation interval, and the form of a segment file name are described to the client apparatus 120. In step S703, the distribution management unit 302 waits until an event occurs. In step S704, if an event has occurred, the distribution management unit 302 determines the type of the event that has occurred.

If the event that has occurred is a video frame generation event (VIDEO FRAME GENERATION in step S704), the processing proceeds to step S705. The video frame generation event is an event generated by the video image acquisition unit 301. If the event that has occurred is a segment generation notification event (SEGMENT GENERATION NOTIFICATION in step S704), the processing proceeds to step S710. The segment generation notification event is an event generated by the distribution management unit 302. In another example, the camera server apparatus 110 may include a generation unit that generates a segment generation notification, separately from the distribution management unit 302. The event that has occurred is a segment acquisition request event (SEGMENT ACQUISITION REQUEST in step S704), the processing proceeds to step S720. The segment acquisition request event is an event acquired by the communication processing unit 303 from the external apparatus. If the event that has occurred is a distribution end event (DISTRIBUTION END in step S704), the processing proceeds to step S730.

In step S705, the distribution management unit 302 buffers video frames. In step S706, the distribution management unit 302 determines whether a number of frames corresponding to the number of segments are stored in the buffer. In a case where the distribution management unit 302 determines that a number of frames corresponding to the number of segments are stored in the buffer (YES in step S706), the processing proceeds to step S707. In a case where the distribution management unit 302 determines that a number of frames corresponding to the number of segments are not stored in the buffer (NO in step S706), the processing returns to step S703. In other words, the distribution management unit 302 shifts to an event waiting state. In step S707, the distribution management unit 302 generates a segment. In step S708, the distribution management unit 302 sends a segment generation notification to the distribution management unit 302 itself. In step S709, the distribution management unit 302 releases the segmented video frame. After that, the processing returns to step S703.

In step S710, the distribution management unit 302 buffers the segment in the buffer (temporary storage area). In step S711, the distribution management unit 302 determines whether the number of segments exceeds a buffering upper limit. In a case where the number of segments exceeds the buffering upper limit (YES in step S711), the processing proceeds to step S712. In a case where the number of segments does not exceed the buffering upper limit (NO in step S711), the processing returns to step S703. In step S712, the distribution management unit 302 releases old segments, and then the processing returns to step S703.

In step S720, the distribution management unit 302 determines whether the segment requested in the segment acquisition request event is a segment which is reproduced at a timing that does not fall within a reference range (a timing outside of the reference range). The term "reference range" used herein refers to a time range based on the latest segment. According to the present exemplary embodiment, the reference range is a range from an earliest possible timing for a segment present in the buffer to a (future) timing after a preliminarily set time period from buffering of the latest segment. Thus, the start point of the reference range is determined depending on the size of the buffer.

The reference range described above may be a time range based on the time when the segment acquisition request is received by the camera server apparatus 110. Specifically, the distribution management unit 302 determines whether the acquisition request is an acquisition request for designating an index of segment data generated after a lapse of a predetermined time period or longer from a time when the camera server apparatus 110 receives the segment acquisition request. Further, the distribution management unit 302 determines whether the acquisition request is an acquisition request for designating an index of segment data generated before the predetermined time period or longer from the time when the camera server apparatus 110 receives the segment acquisition request.

In a case where the distribution management unit 302 determines that the requested segment is a segment which is reproduced at a timing outside of the reference range (YES in step S720), the processing proceeds to step S721. In a case where the requested segment is a segment which is reproduced at a timing within the reference range (NO in step S720), the processing proceeds to step S726.

The requested segment is a segment which is reproduced at a timing outside of the reference range in the following two cases. That is, in the first case, the requested segment is a segment which is reproduced at a timing prior to the earliest timing in the reference range. In the second case, the requested segment is a segment which is reproduced at a timing after the last timing in the reference range.

In step S721, the distribution management unit 302 reconstructs a segment present in the buffer into the requested segment. Specifically, in step S721, the distribution management unit 302 appends the segment number designated by the acquisition request to segment data, regardless of the order in which the segment is generated (the predetermined order). Next, in step S722, the distribution management unit 302 determines whether the reconstruction is successful. In a case where the reconstruction is successful (YES in step S722), the processing proceeds to step S723. In a case where the reconstruction is unsuccessful (NO in step S722), the processing proceeds to step S725. The processing of step S721 and the determination as to whether the reconstruction is successful will be described in detail below with reference to FIG. 8.

In step S723, the distribution management unit 302 transmits the reconstructed segment to the client apparatus 120. In step S724, the distribution management unit 302 releases the transmitted segment from the buffer. After that, the processing proceeds to step S703. In step S725, the distribution management unit 302 transmits an error response to the client apparatus 120. After that, the processing returns to step S703.

In step S726, the distribution management unit 302 determines whether the segment requested in the segment acquisition request event is present in the buffer. In a case where the requested segment is present in the buffer (YES in step S726), the processing proceeds to step S727. In a case where the requested segment is not present in the buffer (NO in step S726), the processing proceeds to step S729. In step S727, the distribution management unit 302 transmits the requested segment to the client apparatus 120. In step S728, the distribution management unit 302 releases the transmitted segment from the buffer. After that, the processing proceeds to step S703. In step S729, the distribution management unit 302 transmits an error response to the client apparatus 120. After that, the processing proceeds to step S703.

In step S730, the distribution management unit 302 releases all buffered segments. In step S731, the distribution management unit 302 releases all buffered video frames. Then, in step S732, a video image generation stop instruction is transmitted to the video image acquisition unit 301. Thus, the video distribution processing is terminated.

Figure 8:
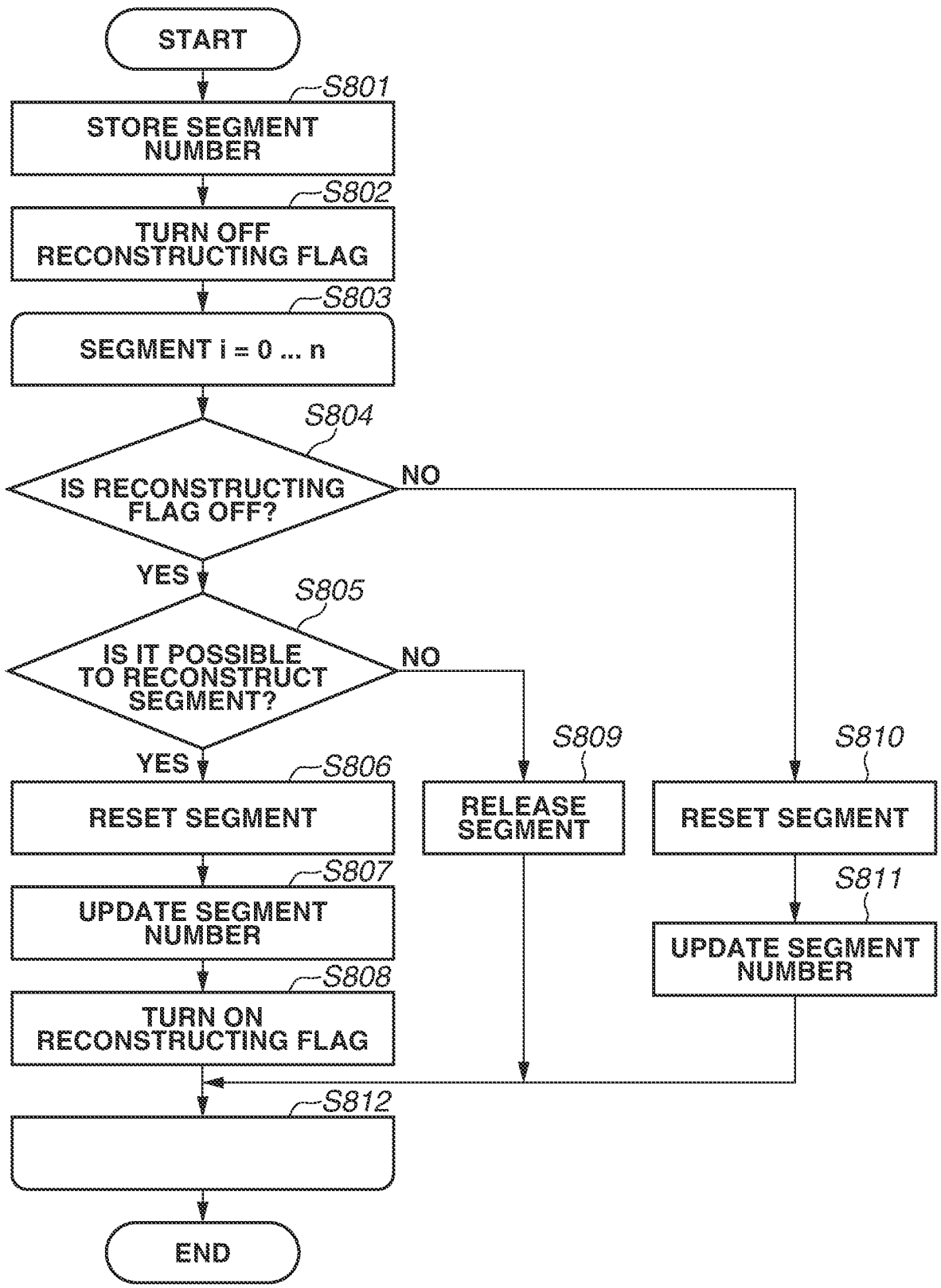
FIG. 8 is a flowchart illustrating segment reconstruction processing.

FIG. 8 is a flowchart illustrating segment reconstruction processing in step S801, the distribution management unit 302 stores the segment number of the segment associated with the segment acquisition request. In step S802, the distribution management unit 302 turns off a reconstructing flag. In step S803, the distribution management unit 302 starts a loop of processing for buffered segments one by one. In the loop processing, first, in step S804, the distribution management unit 302 determines whether the reconstructing flag is OFF. In a case where the reconstructing flag is OFF (YES in step S804), the processing proceeds to step S805. In a case where the reconstructing flag is ON (NO in step S804), the processing proceeds to step S810.

In step S805, the distribution management unit 302 determines whether a target segment can be reconstructed. The term "target segment" used herein refers to a segment selected as a processing target from among the buffered segments. In a case where it is possible to reconstruct the target segment (YES in step S805), the processing proceeds to step S806. In a case where it is not possible to reconstruct the target segment (NO in step S805), the processing proceeds to step S809.

In step S806, the distribution management unit 302 resets the segment. Specifically, the distribution management unit 302 changes time information, segment information, and a file name, which are included as header information, in accordance with the segment associated with the segment acquisition request stored in step S801, without changing the video data included in the target segment. The distribution management unit 302 calculates an elapsed time period from the segment, and updates the value of the earliest presentation time in the BOX sidx 401 and the value of the base media decode time in the BOX tfdt 403, which are described above with reference to FIG. 4. As a result, header information of the target segment is overwritten with header information for identifying the segment associated with the segment request. This processing is an example of the reconstruction processing.

In step S807, the distribution management unit 302 updates the segment with the subsequent number. In step S808, the distribution management unit 302 changes the reconstructing flag to ON. In step S809, the distribution management unit 302 releases the segment. The processing of steps S810 and S811 is similar to the processing of steps S806 and S807. The distribution management unit 302 carries out the above-described processing on all segments. If a new segment is still present in the buffer after the final processing, the distribution management unit 302 determines that the processing is successful and determines the head segment to be the segment to be transmitted. If no segment is present in the buffer, the distribution management unit 302 determines that the processing is unsuccessful. In another example, in consideration of real-time characteristics, if a new segment is still present in the buffer after the final processing, the distribution management unit 302 may determine that the last segment is the segment to be transmitted in place of the head segment.

As described above, when the camera server apparatus 110 according to the present exemplary embodiment receives the acquisition request for the segment which is reproduced at a timing outside of the reference range, the camera server apparatus 110 reconstructs the segment in response to a request, to distribute the segment in response to the request. Thus, the camera server apparatus 110 can continue the segment distribution processing. In other words, according to the present exemplary embodiment, even when a difference is generated between the time of a video distribution apparatus and the time of a client apparatus during distribution of a video image, the distribution processing can be continued without disconnecting the communication.

A first modified example of the first exemplary embodiment will be described. The start point and the end point of the reference range to be referenced in step S702 described above with reference to FIG. 7 are not limited to those described in the exemplary embodiments. For example, the timing of the start point the reference range may be a timing before (earlier than) the latest segment by a preliminarily set period. For example, even when an error is returned for the segment acquisition request, the client apparatus 120 retries the processing several times to continue the distribution processing. However, if an error is continuously returned a predetermined number of times or more, the client apparatus 120 determines that the distribution processing cannot be continued and the communication is disconnected. Thus, the timing of the end point of the reference range may be a timing after about a time period for which the client apparatus 120 repeatedly sends the segment acquisition request without disconnecting the communication from the latest segment. Further, the camera server apparatus 110 may receive disconnect information (information indicating a condition in which the communication is disconnected) indicating a condition for disconnecting the communication, such as a time-out period or a maximum number of retries, from the client apparatus 120, and may determine the timing of the end point of the reference range based on the disconnect information.

In an implementation in which the camera server apparatus 110 releases a segment after the segment is distributed, if the distributed segment is requested again, the camera server apparatus 110 may determine that the segment is a segment which is reproduced at a timing outside of a distribution period.

In a second modified example, the distribution management unit 302 may consider whether a segment to be reconstructed includes an Instantaneous Decoder Refresh (IDR) frame, in the determination as to whether the reconstruction is successful. This is because there is no reference relationship between frames before and after the IDR frame. For example, the distribution management unit 302 may determine that the reconstruction is successful when the segment starts from the IDR frame. In another example, the distribution management unit 302 may determine that the reconstruction is successful when the segment includes the IDR frame.

While the present exemplary embodiment illustrates the distribution method by Moving Picture Experts Group (MPEG)-Dynamic Adaptive Streaming over hyper text transfer protocol (HTTP) (DASH), a third modified example can be applied to the distribution using other HTTP adaptive streaming methods, such as HTTP Live Streaming (HLS), and can also be applied to the other distribution methods using time information.

Next, differences between the video distribution system 100 according to a second exemplary embodiment and the video distribution system 100 according to the first exemplary embodiment will be mainly described. In the video distribution system 100 according to the second exemplary embodiment, if the segment reconstruction is unsuccessful, the camera server apparatus 110 continues the distribution processing without returning an error response.

Figure 9:
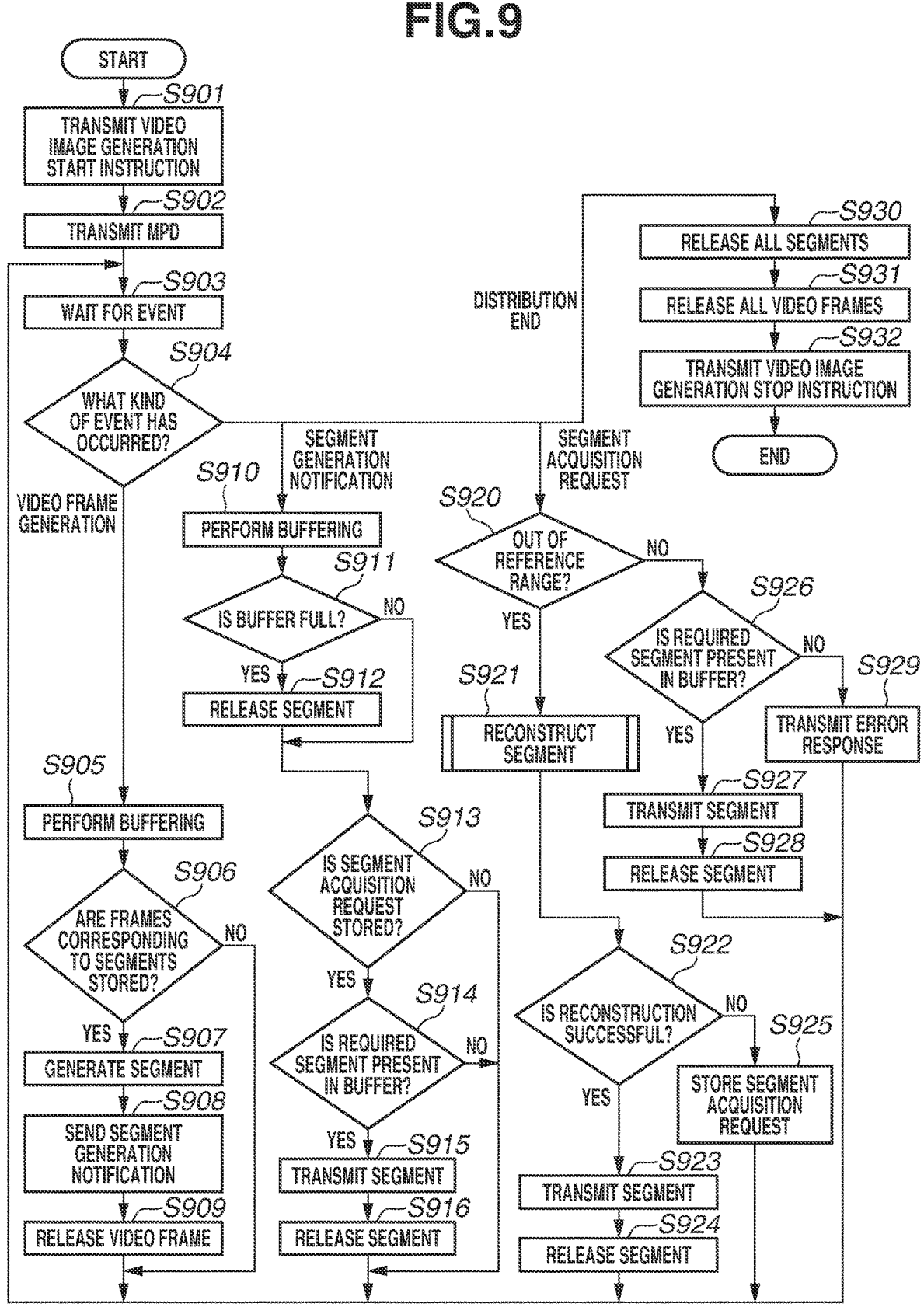
FIG. 9 is a flowchart illustrating video distribution processing according to a second exemplary embodiment.

FIG. 9 is a flowchart illustrating video distribution processing which is performed by the camera server apparatus 110 according to the second exemplary embodiment. The processing of steps S901 to S903 is similar to the processing of steps S701 to S703 described above with reference to FIG. 7. In step S904, the distribution management unit 302 determines the type of the event. In a case where the event that has occurred is the video frame generation event (VIDEO FRAME GENERATION in step S904), the processing proceeds to step S905. In a case where the event that has occurred is the segment generation notification event (SEGMENT GENERATION NOTIFICATION in step S904), the processing proceeds to step S910. In a case where the event that has occurred is the segment acquisition request event (SEGMENT ACQUISITION REQUEST in step S904), the processing proceeds to step S920. In a case where the event that has occurred is the distribution end event (DISTRIBUTION END in step S904), the processing proceeds to step S930. The processing of steps S905 to S909 and the processing of steps S930 to S932 are similar to the processing of steps S705 to S709 and the processing of steps S730 to S732, respectively.

The processing of steps S910 to S912 is similar to the processing of steps S710 to S712. In step S911, in a case where the number of segments does not exceed the buffering upper limit (NO in step S911), the processing proceeds to step S913. Meanwhile, in a case where the processing proceeds to step S912 (YES in step S911), the processing then proceeds to step S913 after the processing of step S912. In step S913, the distribution management unit 302 determines whether the segment acquisition request is already stored. In a case where the segment acquisition request is stored (YES in step S913), the processing proceeds to step S914. In a case where the segment acquisition request is not stored (NO in step S913), the processing returns to step S903.

In step S914, the distribution management unit 302 determines whether the segment associated with the stored segment acquisition request is present in the buffer. In a case where the segment is present in the buffer (YES in step S914), the processing proceeds to step S915. In a case where the segment is not present in the buffer (NO in step S914), the processing returns to step S903. In step S915, the distribution management unit 302 transmits the buffered segment to the client apparatus 120 as the segment associated with the stored segment acquisition request. In step S916, the distribution management unit 302 releases the transmitted segment. After that, the processing returns to step S903.

The processing of steps S920 to S924 is similar to the processing of steps S720 to S724. However, in step S922, in a case where the reconstruction is unsuccessful (NO in step S922), the processing proceeds to step S925. Then, in step S925, the distribution management unit 302 stores the segment acquisition request. According to the present exemplary embodiment, step S913 is executed after the segment acquisition request is stored in step S926. In this case, in step S913, it is determined that the segment acquisition request is stored, and in step S915, a newly generated segment is transmitted to the segment associated with the segment acquisition request. The processing of steps S926 to S929 is similar to the processing of steps S726 to S729. The other configuration and processing of the video distribution system 100 according to the second exemplary embodiment are similar to the configuration and processing of the video distribution system 100 according to the first exemplary embodiment.

As described above, like the camera server apparatus 110 according to the first exemplary embodiment, the camera server apparatus 110 according to the second exemplary embodiment reconstructs a segment in response to a request when the acquisition request for the segment which is reproduced at a timing outside of the reference range is received. The camera server apparatus 110 according to the second exemplary embodiment does not return an error response even when the reconstruction is unsuccessful. Consequently, the continuity of the distribution processing can be further improved.

Next, differences between the video distribution system 100 according to a third exemplary embodiment and the video distribution system 100 according to other exemplary embodiments will be mainly described. When the camera server apparatus 110 according to the third exemplary embodiment receives the acquisition request for the segment which is reproduced at a timing outside of the reference range, the camera server apparatus 110 discards the buffered segment and transmits a newly generated segment as the segment associated with the segment acquisition request.

Figure 10:
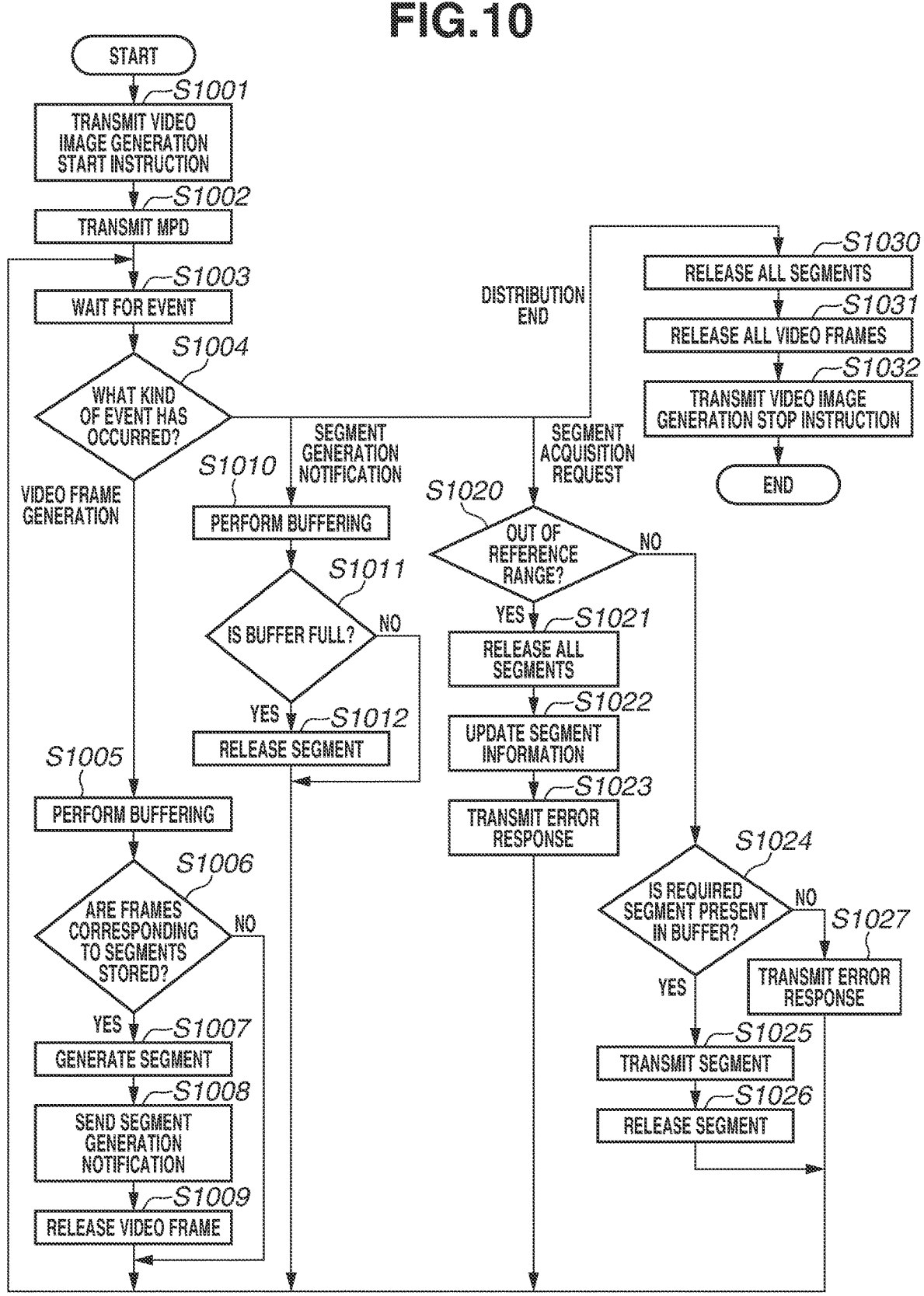
FIG. 10 is a flowchart illustrating video distribution processing according to a third exemplary embodiment.

FIG. 10 is a flowchart illustrating video distribution processing to be performed by the camera server apparatus 110 according to the third exemplary embodiment. The processing of steps S1001 to S1003 is similar to the processing of steps S701 to S703 described above with reference to FIG. 7. In step S1004, the distribution management unit 302 determines the type of the event. In a case where the event that has occurred is the video frame generation event (VIDEO FRAME GENERATION in step S1004), the processing proceeds to step S1005. In a case where the event that has occurred is the segment generation notification event (SEGMENT GENERATION NOTIFICATION in step S1004), the processing proceeds to step S1010. In a case where the event that has occurred is the segment acquisition request event (SEGMENT ACQUISITION REQUEST in step S1004), the processing proceeds to step S1020. In a case where the event that has occurred is the distribution end event (DISTRIBUTION END in step S1004), the processing proceeds to step S1030. The processing of steps S1005 to S1009 and the processing of steps S1010 to S1012 are similar to the processing of steps S705 to S709 and the processing of steps S710 to S712, respectively. The processing of steps S1030 to S1032 is similar to the processing of steps S730 to S732.

In step S1020, the distribution management unit 302 determines whether the segment requested in the segment acquisition request event is a segment which is reproduced at a timing outside of the reference range. In a case where the distribution management unit 302 determines that the requested segment is a segment which is reproduced at a timing outside of the reference range (YES in step S1020), the processing proceeds to step S1021. In a case where the distribution management unit 302 determines that the requested segment is not a segment which is reproduced at a timing outside of the reference range (NO in step S1020), the processing proceeds to step S1024. In step S1021, the distribution management unit 302 releases all buffered segments. In step S1022, the distribution management unit 302 updates segment information so that a segment to be subsequently created is generated as the segment associated with the segment acquisition request.

In step S1023, the distribution management unit 302 transmits an error response. After the processing of step S1023, the processing proceeds to step S1003. The processing of steps S1024 to S1027 is similar to the processing of steps S726 to S729. The other configuration and processing of the video distribution system 100 according to the third exemplary embodiment are similar to the configuration and processing of the video distribution system 100 according to other exemplary embodiments.

As described above, when the camera server apparatus 110 according to the third exemplary embodiment receives the acquisition request for a segment which is reproduced at a timing outside of the reference range, the camera server apparatus 110 discards the buffered segment and returns an error response. On the other hand, when the camera server apparatus 110 receives the segment acquisition request again by retry processing, the camera server apparatus 110 transmits a newly generated segment as the segment associated with the segment acquisition request, whereby the distribution processing can be continued. The third exemplary embodiment has an advantage that there is no need for the camera server apparatus 110 to perform reconstruction processing.

Next, differences between the video distribution system 100 according to a fourth exemplary embodiment and the video distribution system 100 according to other exemplary embodiments will be mainly described. When the camera server apparatus 110 according to the fourth exemplary embodiment receives the acquisition request for a segment which is reproduced at a timing outside of the reference range, the camera server apparatus 110 discards the buffered segment and continues the distribution processing without returning an error response.

Figure 11:
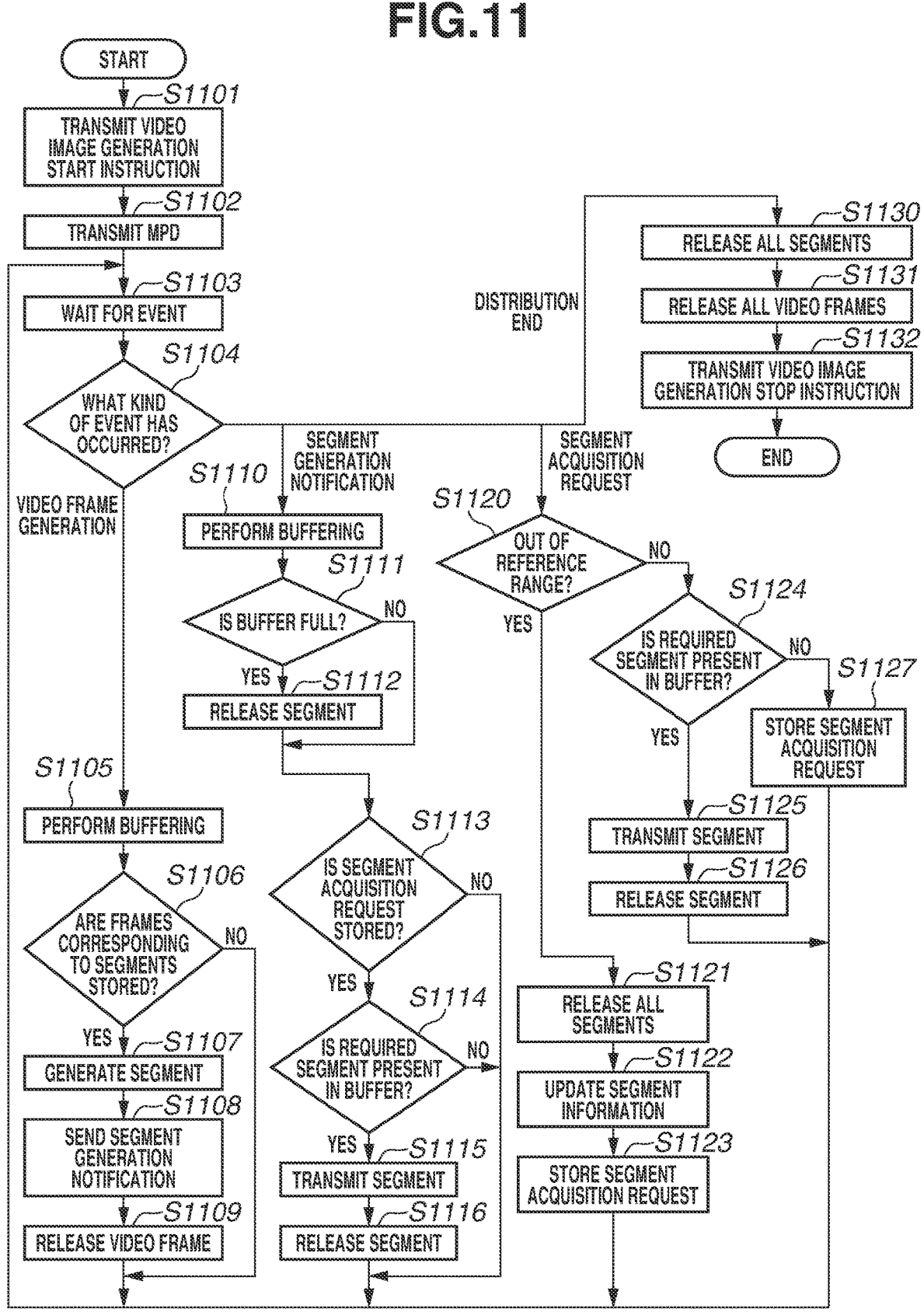
FIG. 11 is a flowchart illustrating video distribution processing according to a fourth exemplary embodiment.

FIG. 11 is a flowchart illustrating video distribution processing to be performed by the camera server apparatus 110 according to the fourth exemplary embodiment. The processing of steps S1101 to S1103 is similar to the processing of steps S701 to S703 described above with reference to FIG. 7. In step S1104, the distribution management unit 302 determines the type of the event. In a case where the event that has occurred is the video frame generation event (VIDEO FRAME GENERATION in step S1104), the processing proceeds to step S1105. In a case where the event that has occurred is the segment generation notification event (SEGMENT GENERATION NOTIFICATION in step S1104), the processing proceeds to step S1110. In a case where the event that has occurred is the segment acquisition request event (SEGMENT ACQUISITION REQUEST in step S1104), the processing proceeds to step S1120. In a case where the event that has occurred is the distribution end event (DISTRIBUTION END in step S1104), the processing proceeds to step S1130. The processing of steps S1105 to S1109 and the processing of steps S1130 to S1132 are similar to the processing of steps S705 to S709 and the processing of steps S730 to S732 described above with reference to FIG. 7. The processing of steps S1110 to S1116 is similar to the processing of steps S910 to S916 described above with reference to FIG. 9.

In step S1120, the distribution management unit 302 determines whether the segment requested in the segment acquisition request event is a segment which is reproduced at a timing outside of the reference range. In a case where the requested segment is a segment which is reproduced at a timing outside of the reference range (YES in step S1120), the processing proceeds to step S1121. In a case where the requested segment is not a segment which is reproduced at a timing outside of the reference range (NO in step S1120), the processing proceeds to step S1124. The processing of steps S1121 to S1123 is similar to the processing of steps S1021 to S1023 described above with reference to FIG. 10.

In step S1124, the distribution management unit 302 determines whether the segment requested in the segment acquisition request event is stored in the buffer. In a case where the requested segment is present in the buffer (YES in step S1124), the processing proceeds to step S1125. In a case where the requested segment is not present in the buffer (NO in step S1124), the processing proceeds to step S1127. The processing of steps S1125 and S1126 is similar to the processing of steps S727 and S728 described above with reference to FIG. 7. In step S1127, the distribution management unit 302 stores the segment acquisition request. After the processing of step S1127, the processing returns to step S1103. The other configuration and processing of the video distribution system 100 according to the fourth exemplary embodiment are similar to the configuration and processing of the video distribution system 100 according to other exemplary embodiments.

As described above, when the camera server apparatus 110 according to the third exemplary embodiment receives the acquisition request for a segment which is reproduced at a timing outside of the reference range, the camera server apparatus 110 discards the buffered segment without returning an error response. Then, the camera server apparatus 110 transmits a newly generated segment as the segment associated with the segment acquisition request. Consequently, the distribution processing can be continued.

While preferred exemplary embodiments of the present invention have been described in detail above, the present invention is not limited to the specific exemplary embodiments. The present invention can be modified or changed in various ways within the scope of the present invention described in the claims.

The present invention can also be implemented by processing in which a program for implementing one or more functions according to the exemplary embodiments described above is supplied to a system or an apparatus via a network or a storage medium, and one or more processors in the system or the apparatus read out and execute the program. The present invention can also be implemented by a circuit (e.g., an application specific integrated circuit (ASIC)) for implementing one or more functions according to the exemplary embodiments.

According to the exemplary embodiments described above, it is possible to continue distribution processing without disconnecting a communication even when a difference is generated between the time of the video distribution apparatus and the time of the client apparatus during distribution of a video image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)®), a flash memory device, a memory card, and the like.

While the present invention has been described with reference to exemplary embodiments, it is to be understood that the invention is not limited to the disclosed exemplary embodiments.

This application claims the benefit of Japanese Patent Application No. 2018-139326, filed Jul. 25, 2018, which is hereby incorporated by reference herein in its entirety.

What is claimed is:

1. A video distribution apparatus comprising:
at least one processor causing the video distribution apparatus to act as:
a generation unit configured to generate a plurality of segment data, and to append an index including time information of the segment data, wherein each of the plurality of the segment data corresponds to a predetermined time period of video data;
a reception unit configured to receive, from an external apparatus, an acquisition request for the segment data to which an index corresponding to a current time of the external apparatus is appended; and
a transmission unit configured to transmit, to the external apparatus, the segment data for the acquisition request received by the reception unit,
wherein in a case where, after the transmission unit transmits a first segment data, the reception unit receives from the external apparatus an acquisition request for a third segment data to be generated without receiving an acquisition request for a second segment data already generated subsequent to the first segment data and before the third segment data, the generation unit is configured to not change image data included in the second segment data and to change time information included in an index appended to the second segment data to time information corresponding to the third segment data to update the second segment data as the third segment data, and
wherein the transmission unit transmits the second segment data updated as the third segment data to the external apparatus in response to the acquisition request for the third segment data.

2. The video distribution apparatus according to claim 1, further comprising
a storage unit configured to store the segment data generated by the generation unit,
wherein the third segment data is generated after a predetermined time range has lapsed after the reception unit receives the acquisition request for the first segment data,
wherein the predetermined time range is a time range determined depending on a size of a storage area in the storage unit.

3. A method for a video distribution apparatus, comprising:
generating a plurality of segment data and appending an index including time information of the segment data, wherein each of the plurality of the segment data corresponds to a predetermined time period of video data;
receiving, from an external apparatus, an acquisition request which is for the segment data to which an index corresponding to a current time of the external apparatus is appended; and transmitting, to the external apparatus, the segment data for the acquisition request received by a acquisition reception unit, wherein in the generation of the segment data, in a case where, after transmitting a first segment data, the reception unit receives from the external apparatus an acquisition request for a third segment data to be generated without receiving an acquisition request for a second segment data already generated subsequent to the first segment data and before the third segment data, image data included in the second segment data is not changed and time information included in an index appended to the second segment data is changed to time information corresponding to the third segment data to update the second segment data as the third segment data, and wherein the second segment data updated as the third segment data is transmitted to the external apparatus in response to the acquisition request for the third segment data.

4. A computer-readable non-transitory recording medium storing a program for causing a computer to function as:

a generation unit configured to generate a plurality of segment data and to append an index including time information of the segment data, wherein each of the plurality of the segment data corresponds to a predetermined time period of video data;

a reception unit configured to receive, from an external apparatus, an acquisition request for the segment data to which an index corresponding to a current time of the external apparatus is appended; and a transmission unit configured to transmit, to the external apparatus, the segment data for the acquisition request received by the reception unit, wherein in a case where, after the transmission unit transmits a first segment data, the reception unit receives from the external apparatus an acquisition request for a third segment data to be generated without receiving an acquisition request for a second segment data already generated subsequent to the first segment data and before the third segment data, the generation unit is configured to not change image data included in the second segment data and to change time information included in an index appended to the second segment data to time information corresponding to the third segment data to update the second segment data as the third segment data, and wherein the transmission unit transmits the second segment data updated as the third segment data to the external apparatus in response to the acquisition request for the third segment data.

* * * * *